US009593034B2

(12) United States Patent
Ochs

(10) Patent No.: US 9,593,034 B2
(45) Date of Patent: Mar. 14, 2017

(54) METHOD FOR PRODUCING IRON-DOPED SILICA GLASS

(71) Applicant: Heraeus Quarzglas GmbH & Co. KG, Hanau (DE)

(72) Inventor: Stefan Ochs, Gelnhausen (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 0 days.

(21) Appl. No.: 14/916,608

(22) PCT Filed: Sep. 11, 2014

(86) PCT No.: PCT/EP2014/069408
§ 371 (c)(1),
(2) Date: Mar. 4, 2016

(87) PCT Pub. No.: WO2015/036493
PCT Pub. Date: Mar. 19, 2015

(65) Prior Publication Data
US 2016/0200620 A1    Jul. 14, 2016

(30) Foreign Application Priority Data
Sep. 16, 2013 (DE) ........................ 10 2013 110 177

(51) Int. Cl.
*C03B 19/06* (2006.01)
*C03C 3/06* (2006.01)
(Continued)

(52) U.S. Cl.
CPC .............. *C03B 19/06* (2013.01); *C03B 25/02* (2013.01); *C03B 37/01413* (2013.01);
(Continued)

(58) Field of Classification Search
CPC ... C03B 19/06; C03B 37/01446; C03B 25/02; C03B 37/01413; C03B 2201/075; C03B 2201/40; C03C 3/06; C03C 2203/00
(Continued)

(56) References Cited

U.S. PATENT DOCUMENTS 2,904,713 A * 9/1959 Heraeus et al. ........ C03B 19/01
                                                          220/2.1 R
3,486,913 A    12/1969 Zirngibl et al.
(Continued)

FOREIGN PATENT DOCUMENTS

JP    H07215735 A    8/1995

OTHER PUBLICATIONS

English translation of International Preliminary Report on Patentability issued Mar. 31, 2016 in International Application No. PCT/EP2014/069408.
(Continued)

*Primary Examiner* — Nahida Sultana
(74) *Attorney, Agent, or Firm* — Panitch Schwarze Belisario & Nadel LLP

(57) ABSTRACT

A method for producing a blank of iron-doped silica glass with high silicic acid content for use as heat protection glass is provided. The method involves: (a) producing an iron-doped $SiO_2$ soot body which contains iron in a first oxidation state $Fe^{3+}$ by flame hydrolysis of a silicon-containing and an iron-containing starting substance, (b) drying the soot body to obtain a mean hydroxyl group content of less than 10 ppm by weight, and (c) vitrifying the soot body under a reducing atmosphere that is suitable for at least partially reducing the iron from the first oxidation state $Fe^{3+}$ to a second, lower oxidation state $Fe^{2+}$. A blank is obtained having an iron content between 0.1 and 1% by weight which exhibits an internal transmission of at most 40% in the infrared wave-
(Continued)

length range and an internal transmission of at least 85% in the visible spectral range.

14 Claims, 2 Drawing Sheets

(51) Int. Cl.
 *C03B 37/014* (2006.01)
 *C03B 25/02* (2006.01)
(52) U.S. Cl.
 CPC .......... *C03B 37/01446* (2013.01); *C03C 3/06* (2013.01); *C03B 2201/075* (2013.01); *C03B 2201/40* (2013.01); *C03C 2203/00* (2013.01)
(58) Field of Classification Search
 USPC ........ 65/395, 414, 416, 424, 426, 17.4, 900, 65/DIG. 16
 See application file for complete search history.

(56) References Cited

U.S. PATENT DOCUMENTS

| | | | |
|---|---|---|---|
| 4,419,118 A | 12/1983 | Reiji et al. | |
| 4,500,642 A | 2/1985 | Reiji et al. | |
| 4,789,389 A * | 12/1988 | Schermerhorn | C03B 19/06 501/12 |
| 4,812,155 A * | 3/1989 | Kyoto | C03B 37/01446 65/397 |
| 5,043,002 A | 8/1991 | Dobbins et al. | |
| 5,221,309 A * | 6/1993 | Kyoto | C03B 37/01446 65/17.4 |
| 5,259,856 A * | 11/1993 | Ohga | C03B 37/01446 65/423 |
| 5,326,729 A * | 7/1994 | Yaba | C03B 19/1453 423/335 |
| 5,631,522 A * | 5/1997 | Scott | C03C 3/06 313/571 |
| 6,136,736 A * | 10/2000 | Rajaram | C03C 3/06 313/571 |
| 6,619,073 B2 | 9/2003 | Borrelli et al. | |
| 2004/0114903 A1 | 6/2004 | Yamaguchi et al. | |
| 2004/0250573 A1* | 12/2004 | Hack | C03C 3/06 65/17.4 |

OTHER PUBLICATIONS

Office Action issued Apr. 30, 2014 in DE Application No. 102013110177.1.

International Search Report (with English translation) and Written Opinion issued Dec. 22, 2014 in International Application No. PCT/EP2014/069408.

* cited by examiner

METHOD FOR PRODUCING IRON-DOPED SILICA GLASS

CROSS-REFERENCE TO RELATED APPLICATIONS

This application is a Section 371 of International Application No. PCT/EP2014/069408, filed Sep. 11, 2014, which was published in the German language on Sep. 11, 2014, under International Publication No. WO 2015/036493 A1 and the disclosure of which is incorporated herein by reference.

BACKGROUND OF THE INVENTION

Glasses are known that are absorbing in the infrared spectral range (wavelength range about 800 nm to 2 μm) and are light-transmitting in the visible spectral range (wavelength range 400 nm to 800 nm). These so-called heat protection glasses or short-pass filter glasses are normally iron-doped glasses. Depending on the manufacturing conditions (raw materials, glass matrix, melting temperature and atmosphere), iron is incorporated in glasses as metallic iron (colloidal), as $Fe^{2+}$, or as $Fe^{3+}$. $Fe^{3+}$ exhibits absorption bands in the ultraviolet range at about 380 nm and 410 nm, the extensions of which in the visible range lead to a brownish yellow coloration. By contrast, the $Fe^{2+}$ ion has overlapping absorption bands in the infrared range (at about 1000 nm and at 2000 nm), the extensions of which into the visible range give the glass a blue color. If both oxidation stages are present, the glass appears to be greenish. The alkali ions that are present in ordinary soda-lime-silica glasses shift the balance between $Fe^{2+}$ and $Fe^{3+}$ in favor of $Fe^{3+}$, which limits the use of such glasses as heat protection glasses because of the relatively poor transmission in the visible spectral range.

In a known method for producing iron-doped glass, a porous silicate glass is impregnated with an iron salt solution. The starting materials are borosilicate glasses that are leached for producing the porous $SiO_2$ skeleton, but residues of boron remaining in the glass strongly reduce the heat resistance. Moreover, depending on the process management, iron is present in the form of $Fe^{3+}$ and $Fe^{2+}$ ions during production of these glasses; the relatively high amount of $Fe^{3+}$ reduces light transmission in the visible spectral range and the use as a heat protection glass is therefore unsatisfactory.

On account of these problems, heat protection glasses have been suggested that are based on quartz glass as the starting substance and are doped with iron (hereinafter also called "iron-doped silica glass").

Such glasses are known from U.S. Pat. No. 4,500,642 A and U.S. Pat. No. 4,419,118 A, which describe the quartz glass being doped with iron and aluminum. The corresponding oxides are added in powder form during fusion of a natural quartz grain in an oxyhydrogen flame or an electric arc. The block-shaped blanks obtained thereby are subjected to a post-treatment in a hydrogen-containing atmosphere after fusion, so that the oxidation state of the iron is changed in favor of $Fe^{2+}$ ions. As a result of the post-treatment, the color of the Fe-doped silica glass changes from more or less brown at the beginning to clear transparent-turquoise blue. This change is also confirmed by the transmission measurement in the visible or infrared spectral range. The fused Fe-doped silica glass without post-treatment in hydrogen-containing atmosphere only shows a transmission of not more than 20% in the visible spectral range, this transmission rising to about 40% in the infrared range, whereas the sample after the treatment with hydrogen shows a transmission of more than 80% in the visible spectral range—with an approximately equal absorbing behavior (up to 40%) in the infrared range. According to this prior art, co-doping with aluminum is further considered to be necessary because in the absence of aluminum the Fe-doped silica glass is not sufficiently heat-resistant and a dark coloration of the glass will occur upon permanent use. The latter is due to a stabilizing effect in favor of the oxidation form $Fe^{2+}$ by the multivalent aluminum.

The method according to the prior art requires a time-consuming post-treatment on the already vitrified blank. The diffusion of the hydrogen, which must penetrate through the blank, is decisive for the method. Especially in the case of large-volume blanks, the post-treatment does not yield a sufficiently homogeneous reduction to $Fe^{2+}$. Another disadvantage of the method according to the prior art is the addition of a second dopant because a homogeneous distribution of the second dopant and the reproducible adjustment of the oxidation state of the iron poses problems due to the second dopant.

BRIEF SUMMARY OF THE INVENTION

It is the object of the present invention to provide an alternative method for producing a blank of Fe-doped silica glass in which the ratio of $Fe^{2+}/Fe^{3+}$ is influenced in favor of $Fe^{2+}$ and the aforementioned disadvantages of the known method are avoided.

The present invention thus relates to a method for producing a blank of iron-doped glass having a high silicic acid content, an iron content in the range between 0.1% by wt. and 1% by wt., an internal transmission of not more than 40% in the infrared wavelength range of 800 nm to 2000 nm, and an internal transmission of at least 85% in the visible spectral range with wavelengths of 400 nm to 800 nm at a sample thickness of 1 mm, for use as a heat protection glass.

Starting from the method of the aforementioned type, this object is achieved according to the invention by the following method steps:

(a) producing an iron-doped $SiO_2$ soot body which contains iron in a first oxidation state $Fe^{3+}$ by flame hydrolysis of a silicon-containing and an iron-containing precursor substance, (b) drying the soot body to obtain a mean hydroxyl group content of less than 10 wt. ppm, and (c) vitrifying the soot body in an atmosphere having a reducing effect which is adapted to reduce the iron at least in part from the first oxidation state $Fe^{3+}$ into a second lower oxidation state $Fe^{2+}$ to form the blank of iron-doped glass having a high silicic acid content.

This method yields synthetic silica glass doped with iron.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
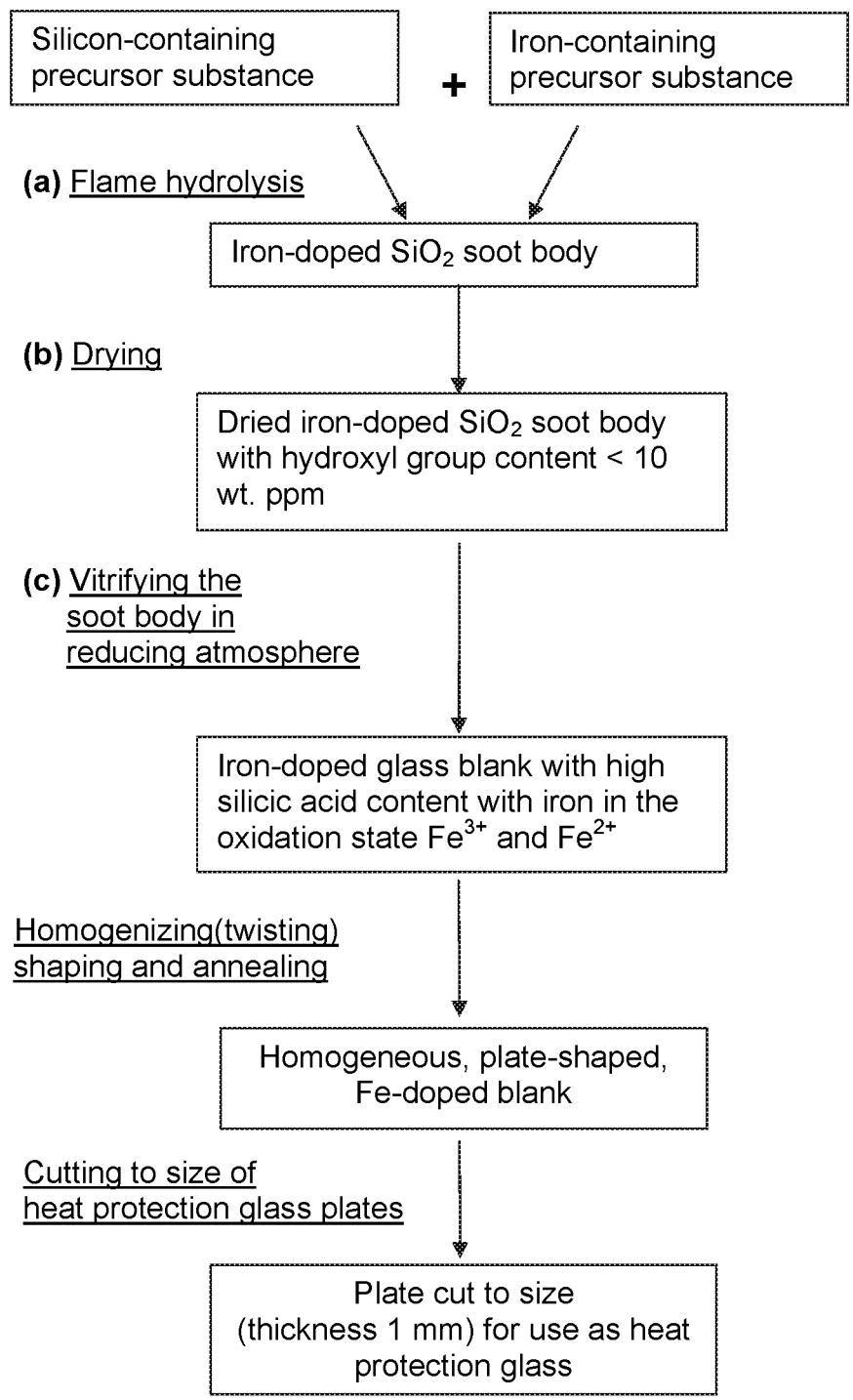
FIG. 1 is a flow diagram of the method according to an embodiment of the invention.

Synthetic, Fe-doped silica glass can in principle also be manufactured according to the single-stage "direct method" in which the deposited, $Fe^{2+}$- and $Fe^{3+}$-containing $SiO_2$ particles are directly vitrified, Here, however, an increased OH content in the range of about 450-1200 wt. ppm is typically obtained. Due to the relatively high OH content, the amount of $Fe^{2+}$ ions is rather low, so that it is only with the help of an intensive post-treatment, for instance in a hydrogen-containing atmosphere as in the prior art, that it is possible to raise the amount of $Fe^{2+}$ to achieve a corresponding transparency in the visible wavelength range. A synthetic Fe-doped silica glass produced according to the direct method is not the subject of the invention.

In the manufacture of synthetic, Fe-doped silica glass according to the so-called "soot method" by flame hydrolysis, $Fe^{2+}$- and $Fe^{3+}$-containing $SiO_2$ particles produced in the flame by hydrolysis or oxidation are deposited on a deposition surface to form an iron-doped soot body. It is only in a further method step that this soot body is vitrified into doped, dense, Fe-doped silica glass. This is followed, prior to vitrification, by drying or by a dehydration treatment to remove the accumulated water so that the formation of bubbles can be excluded during vitrification. Due to the manufacturing process, Fe-doped silica glass produced thereby has hydroxyl group contents in the range of a few wt. ppm to 300 wt. ppm. In the method according to the invention, an OH content of less than 10 wt. ppm is set by the particularly intensive drying treatment. Due to this small amount of OH groups, an "internal oxidation" of the iron can only take place to a small extent, which has a favorable impact on the amount of $Fe^{2+}$. Thus, the soot method is particularly suited for the production of Fe-doped silica glass as the amount of $Fe^{3+}$ can be kept low right from the start. The reducing atmosphere during vitrification ensures that a further amount of the $Fe^{3+}$ ions is also converted into $Fe^{2+}$. Hence, the addition of a further dopant in the form of a multivalent metal, as is described in the prior art for aluminum, is not required.

The amount of $Fe^{2+}$ which is increased with the method according to the invention in comparison with $Fe^{3+}$ has the effect that the Fe-doped silica glass shows no objectionable absorption in the wavelength range of about 400 nm to 800 nm because of $Fe^{3+}$ ions, and the Fe-doped silica glass thus exhibits high transparency in this wavelength range. Ideally, the internal transmission of a sample having a thickness of 1 millimeter is more than 90%, or even more than 95%. Internal transmission stands for the transmission over the sample thickness, corrected by the amount of surface losses. In the infrared range at wavelengths of about 800 nm to 2 µm, however, a strong absorption by $Fe^{2+}$ ions is observed, i.e., the internal transmission is here decreasing to values between 30% and 40%, depending on the iron content. This glass is particularly predestined for use as a heat protection glass.

Suitable method modifications are now explained in more detail hereinafter.

It has turned out to be advantageous when the atmosphere with the reducing effect contains hydrogen. Hydrogen offers the special advantage that it is obtainable on a large scale with high purity and is at any rate mostly available as a burner gas in connection with the manufacture of synthetic quartz glass. The reduction of the iron from the oxidation state $Fe^{3+}$ to the oxidation state $Fe^{2+}$ by the hydrogen-containing atmosphere can be described by the following reaction formula: 2

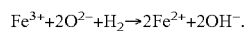

An atmosphere having a reducing effect that contains an amount of hydrogen in helium in the range of 1 mbar to 100 mbar has turned out to be particularly useful. To avoid an atmosphere containing ignitable hydrogen, helium is used as a carrier or inert gas. At a hydrogen partial pressure of more than 100 mbar, there is the risk, at least in the case of prolonged use, that $SiO_2$ is also reduced to SiO and that undesired SiH groups form in the silica glass.

Furthermore, one achieves an optimized process sequence if the atmosphere with the reducing effect shows a pressure below atmospheric pressure (1 bar). Normally, vitrification takes place in an evacuable furnace where the furnace chamber is first evacuated to remove a possible residue of oxidizing atmosphere. Subsequently, an atmosphere with a reducing effect is introduced in such an amount that upon vitrification, a pressure below one bar is obtained in the furnace chamber.

Advantageously, during vitrification according to method step (c), the soot body is isothermally heated in a furnace to a vitrification temperature and thereby exposed for a treatment period of 3 to 15 hours to the atmosphere having the reducing effect. A treatment period of less than 3 hours would reduce an insufficient amount of $Fe^{3+}$ into $Fe^{2+}$, so that the blank produced thereby would show no adequate transparency in the visible spectral range and, depending on the temperature, no complete vitrification of the soot body would be achieved. Apart from the diminished efficiency of a treatment period of more than 15 hours in an atmosphere having a reducing effect, this is not harmful to the reduction of $Fe^{3+}$ to $Fe^{2+}$. However, as a consequence, this may lead to the undesired reduction of $SiO_2$ to substoichiometric $SiO_x$.

Advantageously, after vitrification of the soot body according to method step (c), at least 97% of the iron is obtained in the blank in the oxidation state $Fe^{2+}$. This ensures high transparency in the visible spectral range and high absorption in the infrared range.

A further advantageous measure of the method according to the invention is that after vitrification of the soot body according to method step (c), the blank is annealed in a temperature range of 300° C. to 1000° C. and in an atmosphere containing hydrogen in the range of 15 mbar to 30 bar. Depending on the volume of the blank and after the temperature has been set, the effect of the annealing treatment in hydrogen-containing atmosphere is more or less intensive. The annealing treatment of the blank has, on the one hand, an impact on the setting of the fictive temperature as a measure of the state of order of the glass structure and, on the other hand, the hydrogen leads to the reduction of $Fe^{3+}$ to $Fe^{2+}$, as has been mentioned. Since the treatment in a hydrogen-containing atmosphere only takes place on the vitrified blank, the reaction time, determined by the diffusion of the hydrogen, is relatively long. Nevertheless, as a supportive measure, this has an advantageous effect on the maximization of the amount of $Fe^{2+}$ in the blank.

As an alternative to the annealing of the blank in a hydrogen-containing atmosphere after vitrification, it is also possible to carry out, prior to vitrification according to method step (c), a conditioning treatment of the soot body in an atmosphere having a reducing effect at a temperature in a temperature range of 800° C. to 1100° C. This measure is advantageous for the maximization of the amount of $Fe^{2+}$ ions in the soot body and later blank. An atmosphere containing hydrogen or carbon monoxide (CO) is suited as an atmosphere having a reducing effect. The CO-containing atmosphere can be used as long as the soot body has not yet been sintered to a significant degree so as to avoid gas inclusions and bubble formation by CO and $CO_2$.

As for the drying of the iron-doped $SiO_2$ soot body according to method step (b), it has turned out to be useful when this is carried out at a temperature range of 800° C. to 1100° C. in vacuum at a pressure of less than 10 mbar. This type of thermal drying in vacuum reduces the OH group proportion to less than 10 wt. ppm, so that hardly any OH groups, if possible, are available for internal oxidation from $Fe^{2+}$ to $Fe^{3+}$.

As an advantageous drying alternative, drying according to method step (b) is carried out at a temperature range of 800° C. to 1100° C. and in an atmosphere containing carbon monoxide at a pressure in the range of 5 mbar to 100 mbar. This procedure is particularly efficient as drying is carried out completely or in part in combination with a reduction treatment in relation to the $Fe^{3+}$, and at least a part of $Fe^{3+}$ is already converted into $Fe^{2+}$ prior to vitrification. Drying in an atmosphere containing carbon monoxide (CO) has turned out to be particularly useful. Carbon monoxide has the advantage that possible residual water is expelled from the porous soot body by formation of carbon dioxide ($CO_2$). At the same time, CO produces a reliable reduction from $Fe^{3+}$ to $Fe^{2+}$.

As for the production of the iron-doped $SiO_2$ soot body by flame hydrolysis, several precursor substances have turned out to be advantageous. Preferably, a silicon-containing and at least one iron-containing precursor substance are used. The separate introduction of the silicon- and iron-containing precursor substances ensures a reliable dosage of the iron as dopant. As a rule, however, it is also possible to use precursor substances for the method according to the invention that contain both silicon and iron, for instance iron-substituted silanes or corresponding siloxanes, but with the disadvantage that the iron proportion is thus fixed.

Halogen-free organic compounds, such as octamethylcyclotetrasiloxane (OMCTS) in combination with iron pentacarbonyl ($Fe(CO)_5$) or ferrocene ($C_{10}H_{10}Fe$), are particularly suited as a silicon- and iron-containing precursor substance. In the combustion of OMCTS for the deposition of $SiO_2$ and by comparison with the flame hydrolysis of $SiCl_4$ as halogen-containing, standard precursor substance, a comparatively smaller amount of oxyhydrogen ($H_2/O_2$) is required for the burner flame, which yields a $SiO_2$ soot body with a relatively small amount of OH groups. In combination with an iron-containing precursor substance for the manufacture of the iron-doped $SiO_2$ soot body, the amount of OH groups offered for the possible oxidation of $Fe^{2+}$ into $Fe^{3+}$ is thus advantageously low a priori.

In the case of ferrocene, the iron is present in the oxidation state $Fe^{2+}$, so that this compound in combination with OMCTS is particularly preferred with respect to the low OH group content in the soot body and also with respect to the oxidation state $Fe^{2+}$ in the precursor substance.

However, inorganic compounds containing chlorine or other halogens can also be used in principle. A disadvantageous effect is, however, that more oxyhydrogen is needed in the soot deposition, and the $SiO_2$ soot body obtained thereby has a high OH group content for that reason. The OH groups must be removed by corresponding drying, so that the whole method turns out to be more complicated than one using halogen-free organic precursor substances.

Likewise, the standard drying of the soot body in a chlorine-containing atmosphere is disadvantageous in connection with the method according to the invention because an oxidizing effect must be attributed to the chlorine and other halogens, which in the case of the Fe-doped silica glass promotes the undesired oxidation state $Fe^{3+}$.

EXAMPLE 1

As seen in the flow diagram in FIG. 1, a soot body is first produced by flame hydrolysis of a silicon-containing precursor substance, here octamethylcyclotetrasiloxane (OMCTS), and iron pentacarbonyl ($Fe(CO)_5$) as iron-containing precursor substance, on the basis of the known "outside-vapor-deposition method" (OVD method). The soot body consists of synthetic silica glass which is doped with 0.8% by wt. of iron.

The soot body is dried at a temperature of 1100° C. in a heating furnace with a heating element of graphite under vacuum. The graphite, which is present in the heating furnace, effects the setting of reducing conditions, which increases the proportion of $Fe^{2+}$ ions in the soot body. Upon completion of the dehydration treatment after 50 hours the hydroxyl group content of the soot body is about 10 wt. ppm.

The thermally dried Fe-doped $SiO_2$ soot body is subsequently vitrified in a sintering furnace at a temperature of about 1400° C. for a period of 10 hours into a transparent Fe-doped silica glass blank (step (c) in FIG. 1). To this end, a vacuum of about 100 mbar is first applied and hydrogen is subsequently introduced at a partial pressure of about 100 mbar in helium into the sintering furnace and remains there during the vitrification process.

After removal of the vitrified Fe-doped silica glass blank from the furnace, a thermo-mechanical homogenization (twisting) is first carried out, and then a further shaping process is performed to obtain a cylindrical shaped body. The blank is put into a mold of graphite that has a bottom plate with a round cross-section and an outer diameter of 300 mm. For deformation, the total mold with the blank contained therein is first heated up to 1250° C. and subsequently, with a ramp of 2° C./min to 1600° C., and then with a ramp of 2° C./min heated to a temperature of 1680° C. The silica glass mass is held at that temperature until the softened Fe-doped silica glass has spread out under the action of its own weight onto the bottom plate of the mold, thereby filling up the mold. A round plate with a diameter of 300 mm and a thickness of about 60 mm is thereby formed from the blank, the plate being free of layers and striae in all three viewing directions.

To diminish mechanical stresses and to reduce birefringence, the Fe-doped silica glass blank is subjected to an annealing treatment in which the cylindrical blank is heated to 900° C. during a holding time of 8 hours in an atmosphere containing 1000 mbar hydrogen, and is subsequently cooled down at a cooling rate of 4° C./h to a temperature of 800° C. and held at that temperature for 4 hours. This is followed by cooling to 300° C. at a higher cooling rate of 50° C./h, whereupon the furnace is shut off and the blank is allowed to cool freely in the furnace.

Figure 2:
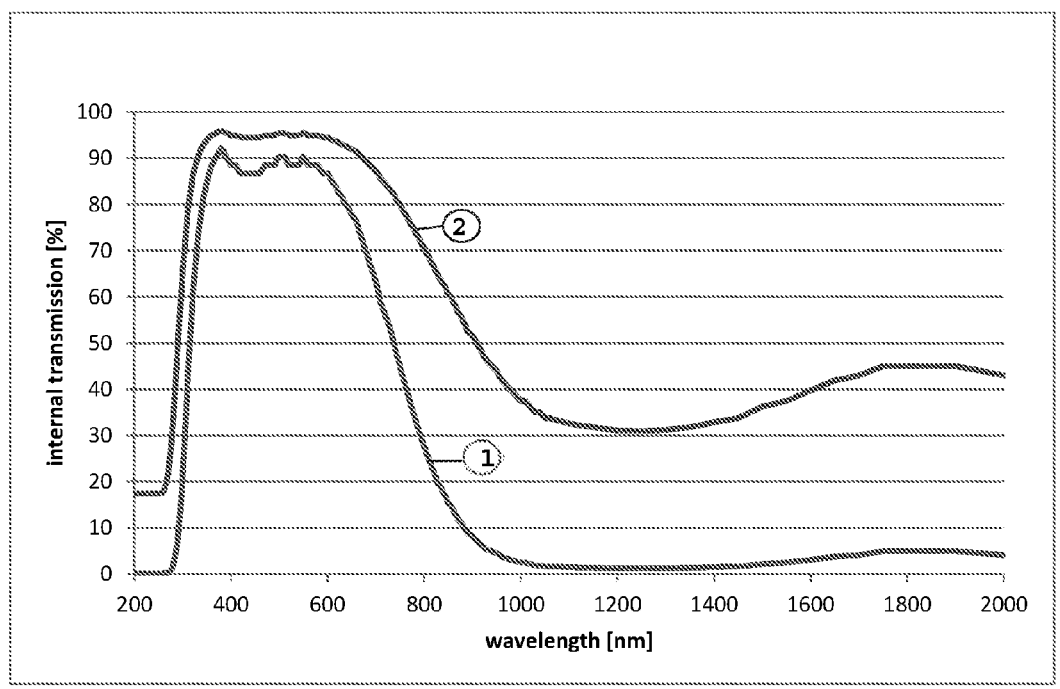
FIG. 2 shows the curves of the internal transmission for blanks produced in the method according to the invention over the wavelength range of 400 nm to 2000 nm.

Since the blank shows a relatively pronounced stress birefringence in its edge portions, an overdimension of about 3 mm is removed from the faces. The blank has a pale turquoise-green color, which hints at a high amount of $Fe^{2+}$. The ratio $Fe^{3+}/Fe^{2+}$ in the range of $3\times10^{-6}$ to $1\times10^{-5}$ yields a high transparency in the visible spectral range and a strong absorption in the infrared range. The blank can now be inspected with the standard optical measuring methods and subjected to further processing steps in conformity with the measurement results obtained. For use as a heat protection glass or short-pass filter, panels of up to about 300 $cm^2$ and a thickness between 1 mm and 10 mm are now cut out of the blank, depending on the application requirements. The internal transmission of a sample with a thickness of 1 mm, Example 1, is shown in FIG. 2 with curve 1 and is about 85% to 92% in the visible spectral range. In the infrared spectral range, an almost complete absorption is detected, i.e., the internal transmission is below 10%. This sample is highly qualified as a heat protection glass, for instance for an application up to 1000° C. A dark coloration of the glass is even not observed during permanent operation.

EXAMPLE 2

Another blank of Fe-doped silica glass is produced, as described above with reference to Example 1, with the difference that ferrocene is used as the iron-containing precursor substance and the drying process is carried out in a CO-containing atmosphere.

After deposition of OMCTS and ferrocene ($C_{10}H_{10}Fe$), the $SiO_2$ soot body is doped with 0.2% by wt. of iron. The soot body is subsequently dried at a temperature of 1000° C., with 100 mbar carbon monoxide (residue: inert gas nitrogen or noble gases) being introduced into the heating furnace with a heating element of graphite. The reducing conditions generated thereby increase, on the one hand, the amount of $Fe^{2+}$ ions in the soot body and lead, on the other hand, to an optimal reduction of the amount of OH groups. Upon completion of this dehydration treatment after 50 hours, the hydroxyl group content of the soot body is below the detection limit (<1 wt. ppm).

The dried Fe-doped $SiO_2$ soot body which is vitrified in a hydrogen atmosphere is homogenized, shaped and annealed, as described with reference to Example 1. The blank obtained thereafter is substantially free of $Fe^{3+}$ ions. The internal transmission of a heat protection plate, which has been produced according to this example, is shown in FIG. 2 with curve 2. The internal transmission in the wavelength range between about 400 nm and 700 nm is 95% and diminishes in the infrared spectral range to values of less than 40%.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A method for producing a blank of iron-doped glass having a high silicic acid content, an iron content of between 0.1% by wt. and 1% by wt., an internal transmission of not more than 40% in the infrared wavelength range of 800 nm to 2000 nm, and an internal transmission of at least 85% in the visible spectral range with wavelengths of 400 nm to 800 nm at a sample thickness of 1 mm, the method comprising:
   (a) producing an iron-doped $SiO_2$ soot body comprising iron in a first oxidation state $Fe^{3+}$ by flame hydrolysis of a silicon-containing and an iron-containing precursor substance,
   (b) drying the soot body to obtain a mean hydroxyl group content of less than 10 wt. ppm, and
   (c) vitrifying the soot body in an atmosphere having a reducing effect to form the blank of iron-doped glass having a high silicic acid content, wherein at least a part of the iron is reduced from the first oxidation state $Fe^{3+}$ to a second lower oxidation state $Fe^{2+}$.

2. The method according to claim 1, wherein the atmosphere having a reducing effect contains hydrogen.

3. The method according to claim 2, wherein the atmosphere having a reducing effect comprises 1 mbar to 100 mbar hydrogen in helium.

4. The method according to claim 1, wherein the atmosphere having a reducing effect has a pressure below atmospheric pressure.

5. The method according to claim 1, wherein step (c) comprises isothermally heating the soot body in a furnace to a vitrification temperature and exposing the soot body to the atmosphere having a reducing effect for a treatment period of 3 to 15 hours.

6. The method according to claim 5, wherein after step (c), at least 97% of the iron in the blank is in oxidation state $Fe^{2+}$.

7. The method according to claim 1, further comprising after vitrification of the soot body according to step (c), annealing the blank at a temperature range of 300° C. to 1000° C. in an atmosphere containing hydrogen at a pressure of 15 mbar to 30 bar.

8. The method according to claim 1, further comprising prior to vitrification according to step (c), performing a conditioning treatment of the soot body in an atmosphere having a reducing effect at a temperature of 800° C. to 1100° C.

9. The method according to claim 1, wherein step (b) is performed at a temperature of 800° C. to 1100° C. in vacuum at a pressure of less than 10 mbar.

10. The method according to claim 1, wherein step (b) is performed at a temperature of 800° C. to 1100° C. an atmosphere containing carbon monoxide at a pressure of 5 mbar to 100 mbar.

11. The method according to claim 1, wherein halogen-free organic compounds are used as the iron- and silicon-containing precursor substances.

12. The method according to claim 11, wherein octamethylcyclotetrasiloxane (OMCTS) is used as the silicon-containing precursor substance.

13. The method according to claim 11, wherein iron pentacarbonyl ($Fe(CO)_5$) is used as the iron-containing precursor substance.

14. The method according to claim 11, wherein ferrocene ($C_{10}H_{10}Fe$) is used as the iron-containing precursor substance.

* * * * *